United States Patent
Humburg

(10) Patent No.: US 6,739,148 B2
(45) Date of Patent: May 25, 2004

(54) TEMPERATURE CONTROL SYSTEM FOR A VEHICLE

(75) Inventor: Michael Humburg, Göppingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/396,153

(22) Filed: Mar. 25, 2003

(65) Prior Publication Data
US 2004/0011069 A1 Jan. 22, 2004

(30) Foreign Application Priority Data
Jul. 16, 2002 (DE) .......................... 102 32 191

(51) Int. Cl.⁷ .............................................. F25B 27/00
(52) U.S. Cl. ........................... 62/236; 62/238.2; 62/244
(58) Field of Search ............................. 62/6, 236, 239, 62/244, 238.2

(56) References Cited

U.S. PATENT DOCUMENTS

| | | | | |
|---|---|---|---|---|
| 3,941,012 A | * | 3/1976 | Mayer | 74/661 |
| 4,843,826 A | * | 7/1989 | Malaker | 62/6 |
| 5,094,083 A | * | 3/1992 | Horn et al. | 62/6 |
| 5,477,687 A | * | 12/1995 | Horn | 62/6 |
| 5,571,251 A | * | 11/1996 | Gamou et al. | 165/42 |
| 5,779,455 A | * | 7/1998 | Steiger | 417/418 |
| 5,896,750 A | * | 4/1999 | Karl | 62/236 |
| 6,230,507 B1 | * | 5/2001 | Ban et al. | 62/228.4 |
| 6,351,957 B2 | * | 3/2002 | Hara | 62/133 |
| 6,536,207 B1 | * | 3/2003 | Kamen et al. | 60/39.6 |

FOREIGN PATENT DOCUMENTS

| | | |
|---|---|---|
| DE | 36 02 634 A1 | 7/1987 |
| DE | 44 14 547 A1 | 11/1995 |
| DE | 197 45 167 A1 | 6/1998 |
| DE | 199 53 940 A1 | 5/2000 |
| JP | 8-94198 | * 4/1996 |

* cited by examiner

Primary Examiner—William E. Tapolcai
(74) Attorney, Agent, or Firm—McGlew and Tuttle, P.C.

(57) ABSTRACT

A temperature control system for a vehicle includes an air-conditioning device (12) with a compressor device (14, 40) for compressing a working medium of the air-conditioning device (12). The compressor device (14, 40) can be driven by a first drive unit (18), preferably the driving motor (18) of a vehicle, and/or a second drive unit (42), whereby the second drive unit (42) comprises a Stirling motor (42).

19 Claims, 2 Drawing Sheets

TEMPERATURE CONTROL SYSTEM FOR A VEHICLE

FIELD OF THE INVENTION

The present invention pertains to a temperature control system for a motor vehicle, comprising an air-conditioning device with a compressor device for compressing a working medium of the air-conditioning device.

BACKGROUND OF THE INVENTION

In modern motor vehicles, especially in utility vehicles, there is increasing demand for temperature control systems that are also able to produce pleasant climatic conditions or pleasant temperatures in a vehicle interior or a driver's cab. Thus, providing parking heaters, by means of which sufficient heating is possible even when the vehicle is at a standstill, has become known. Above all, at high outside temperatures, there is also an increasing demand to provide for cooling when at a standstill, i.e., e.g., if the driving motor of the vehicle is not running, i.e., to make possible a so-called parking cooler or air-conditioner. In this regard, e.g., systems have become known, in which an additional internal combustion engine drives a compressor of an air-conditioning device in order to obtain the necessary flow of working medium in the manner of storage space cooling systems.

SUMMARY OF THE INVENTION

The object of the present invention is to provide a temperature control system for a vehicle, which, with a simple structural design, is additionally able to provide the function of a parking cooler.

According to the present invention, this object is accomplished by a temperature control system for a vehicle, comprising an air-conditioning device with a compressor device for compressing a working medium of the air-conditioning device, whereby the compressor device can be driven by a first drive unit, preferably the driving motor of a vehicle, and/or a second drive unit, whereby the second drive unit comprises a Stirling motor.

Thus, in the temperature control system according to the present invention, it is provided that the compressor device providing for the circulation of the working medium of the air-conditioning device can be operated both by the driving motor of a vehicle, as is usual in conventional vehicle air-conditioning systems, and, as an alternative or in addition, can also be driven by a special drive unit, namely a Stirling motor. This Stirling motor is put into operation if the function of vehicle interior air-conditioning is desired, but at the same time, e.g., the driving motor of the vehicle shall not be operated. A considerable advantage of this is that such Stirling motors have a comparatively simple design with very long operating life and low noise generation.

In order to be able to provide the temperature differences necessary for the operation of a Stirling motor, it is suggested according to an especially advantageous aspect of the present invention that a fuel-operated heater be assigned to the Stirling motor for providing a heating medium for heating a hot area of same. The combustion products produced in this heater may then be used as the heating medium for heating the hot area. It is especially advantageous in this embodiment that it is then also possible to feed a heating heat-exchanger device provided in a vehicle, which, e.g., otherwise takes up heat from a coolant of the vehicle engine for heating the vehicle interior, with the heating medium and thereby to heat the air flowing through the heating heat-exchanger device. The heater to be provided according to the present invention may thus be used both for the air-conditioning, i.e., cooling operation, namely as an energy source for the Stirling motor, and for the heating operation, namely as an energy source for the heating heat exchanger.

Moreover, in order to be able to obtain the temperature differences mentioned above for the Stirling motor, it is suggested that a cooling medium circulation is assigned to the Stirling motor for feeding a cooling medium to a cold area of same. It is especially advantageous if the cooling medium is the coolant of the driving motor of a vehicle. In this case, the driving motor of the vehicle may thus be used as a means for lowering the temperature, in which the cooling medium heated in the Stirling motor discharges heat and thus can again be led to the Stirling motor with a reduced temperature.

In an especially advantageous embodiment of the present invention, it is suggested that the compressor device comprises a first compressor that can be driven by the first drive unit and a second compressor that can be driven by the Stirling motor. Thus, two compressors, which are also structurally separate from one another, are present, which can each be mounted in a vehicle in areas that are especially advantageous for this.

In order to be able to then selectively use one of the compressors in such an arrangement to produce the compressed state of the working medium of the air-conditioning device, it is suggested that a valve array be provided, by means of which the first compressor or the second compressor can be selectively switched on in the working medium circulation.

The Stirling motor to be used in the system according to the present invention may be designed as a free-piston Stirling motor. Such free-piston Stirling motors have a very high efficiency and thus are especially preferred for preventing excessive energy losses.

According to another aspect of the present invention, the object mentioned in the introduction is accomplished by a temperature control system for a vehicle, comprising an air-conditioning device with a compressor device for compressing a working medium of the air-conditioning device, whereby the compressor device can be driven by a drive unit comprising a Stirling motor.

The idea that was already described above of using a Stirling motor as a drive for a compressor of a temperature control system or of the air-conditioning device of same can also be put into practice if this Stirling motor is essentially the only drive source and insofar as, regardless of whether or not the driving motor of the vehicle is put into operation, the air-conditioning device is always operated using the Stirling motor.

The present invention is described in detail below with reference to the attached drawings based on preferred embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
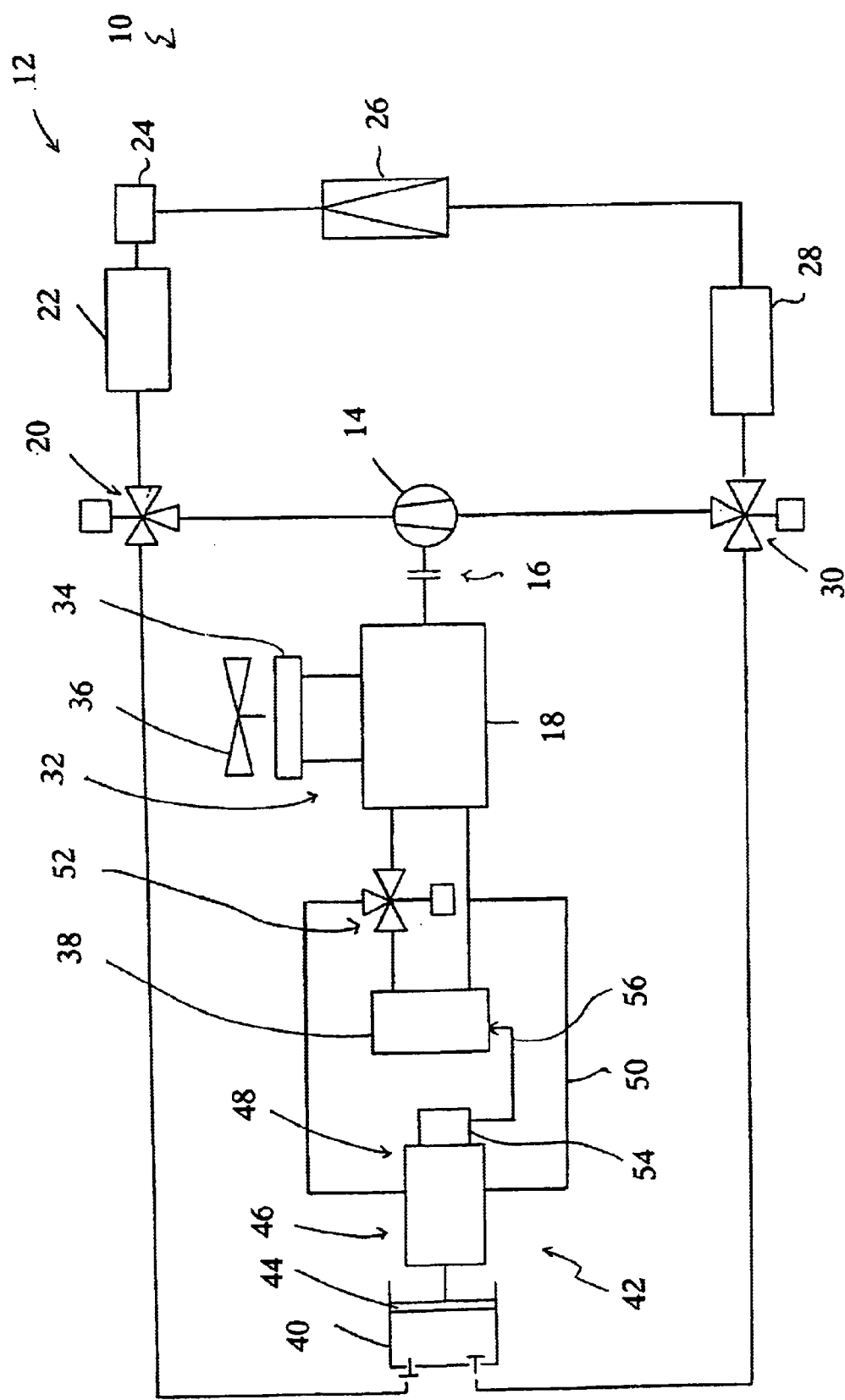
FIG. 1 is a basic view of a temperature control system for a vehicle according to the present invention.

Referring to the drawings in particular, in FIG. 1, a temperature control system that can be used in a vehicle is generally designated by 10. This temperature control system 10 comprises an air-conditioning device 12 as a system area. A compressor 14 of the air-conditioning device 12 may be coupled to a driving motor 18 of the vehicle, e.g., via a fluid coupling 16. Via a three/two-way solenoid valve 20, the working medium of the air-conditioning device 12 previously fed under pressure by the compressor 14 can flow to an expansion valve 26 via a capacitor 22 and a drier 24. After flowing through the evaporator 28, the working medium then arrives back to the compressor 14 via another three/two-way solenoid valve 30. Thus, by using the compressor 14, the air-conditioning device 12 can be operated if the vehicle motor 18 is put into operation, i.e., e.g., during the travel of the vehicle or with the driving motor 18 running when the vehicle is at a standstill.

The driving motor 18 also comprises a coolant circulation generally designated by 32. This coolant circulation 32 contains a cooler 34, in which the coolant circulating in the coolant circulation 32 is also cooled, e.g., by using a fan 36, for the corresponding cooling of the driving motor 18. Another area of the coolant circulation 32 contains a heating heat exchanger 38, in which heat transported in the coolant of the driving motor 18 can be transferred to the air to be led into a vehicle interior. The heating heat exchanger 38 is thus put into operation above all at low outside temperatures, i.e., an operating state, in which the air-conditioning device 12 is not activated or is possibly activated for drying air that is too humid. It is a matter of course that the coolant circulating in the various areas of the coolant circulation 32 is driven for circulation by a pump (not shown), and that, likewise a matter of course, this coolant circulation may also contain other system components.

Another fundamental component of the temperature control system 10 according to the present invention or the air-conditioning device 12 of same is another compressor 40. This compressor 40 lies, with respect to the flow of the working medium of the air-conditioning device 12, in parallel to the compressor 14 already discussed above and to be activated by the driving motor 18. Depending on the switching state of the two valves 20, 30 one of these two compressors 14, 40 can be switched on in the working medium circulation, so that the working medium, in the vapor state, leaving the evaporator 28 is compressed either by the compressor 14 or by the compressor 40 and is then fed to the capacitor 22.

While the driving motor 18 of the vehicle is assigned to the compressor 14 as the drive unit in the example shown, even though, however, a separate motor might also be assigned for this, for example, a Stirling motor 42 to be described in detail below is assigned to the compressor 40 as the drive unit. This Stirling motor 42 drives a piston 44 of the compressor 40 designed in the example shown as a piston compressor for movement and thereby produces the necessary pressure in the working medium of the air-conditioning device 12. As is well known, such a Stirling motor 42 has a cold area, generally designated by 46 in FIG. 2, and a hot area designated by 48. To the cold area 46 is assigned a cooling medium circulation 50, which, in the example shown, is essentially formed by a branch of the coolant circulation 32 of the driving motor 18, whereby the circulation of coolant is released or can be interrupted here, e.g., by the cold area 46 of the Stirling motor 42 by the corresponding adjustment of another three/two-way solenoid valve 52. In the example shown, this cooling medium circulation 50 branches off from that area of the coolant circulation 32, which also feeds the heating heat exchanger 38. Of course, a branch from the area of the circulation 32 leading to the cooler 34 might also be provided here.

In order to be able to provide the necessary heat in the hot area, a heater generally designated by 54 is assigned to the Stirling motor 42. The heater 54 is preferably a fuel-operated heater and includes, e.g., an evaporator burner or an atomizing burner, into which fuel and air for combustion are fed and, upon combustion, heat is then produced, which is transported in the combustion exhaust gases or combustion products. In order to be able to create the function of a parking heater or an auxiliary heater in a phase, in which a cooling of a vehicle interior is not necessary, i.e., e.g., at comparatively low outside temperatures, in the temperature control system according to the present invention, it is possible to transport the heat provided in the heater 54, as indicated by a line section 56, by means of the combustion exhaust gases to the heating heat exchanger 38 and to transfer the heat to the air to be led into the vehicle interior. Depending on whether or not this functionality is desired, e.g., a corresponding feeding of the combustion exhaust gases to the heating heat exchanger 38 using a valve array can be released or can be interrupted, so that otherwise the combustion exhaust gases are discharged to the outside directly via a exhaust gas guiding system.

In the temperature control system 10 shown in FIG. 1, a fundamentally improved functionality is thus achieved compared to conventional systems. On the one hand, it is possible to operate the air-conditioning device 12 in an efficient manner even if the driving motor 18 is not activated, namely by corresponding activation of the Stirling motor 42 to be additionally provided. On the other hand, by using the heat source provided for the Stirling motor 42, namely of the heater 54, it is possible to achieve the function of a parking heater or an auxiliary heater even when the air-conditioning device 12 is shut down, without having to provide any additional components for this. Moreover, a markedly improved controllability of this system area is achieved especially in the state of operation, in which the Stirling motor 42 is the energy source for the air-conditioning device 12, and if an operation of the air-conditioning device 12 independent of the driving motor 18 is present, whereby, compared to a conventional parking heating system, no fundamental, additional electrical energy consumers are present. Based on these advantages in the operation of the air-conditioning device 12 using the Stirling motor 42, it is also basically conceivable to design the temperature control system 10 according to the present invention, so that only a single compressor is provided, namely the compressor 40, which is then operated in all phases of operation by the Stirling motor 42. Basically, a simplification of the entire system can also be achieved by providing only a single compressor, e.g., the compressor 14, which is then selectively driven by the driving motor 18 or the Stirling motor 42. In this case a corresponding coupling device or additional coupling device would be provided, by means of which the coupling and uncoupling in relation to the Stirling motor can then be achieved. Moreover, it should be pointed out that the compressor shown in conjunction with the Stirling motor 42 is, above all, to be considered only as an example and symbolically and, of course, the widest variety of types of compressors may be used here.

Figure 2:
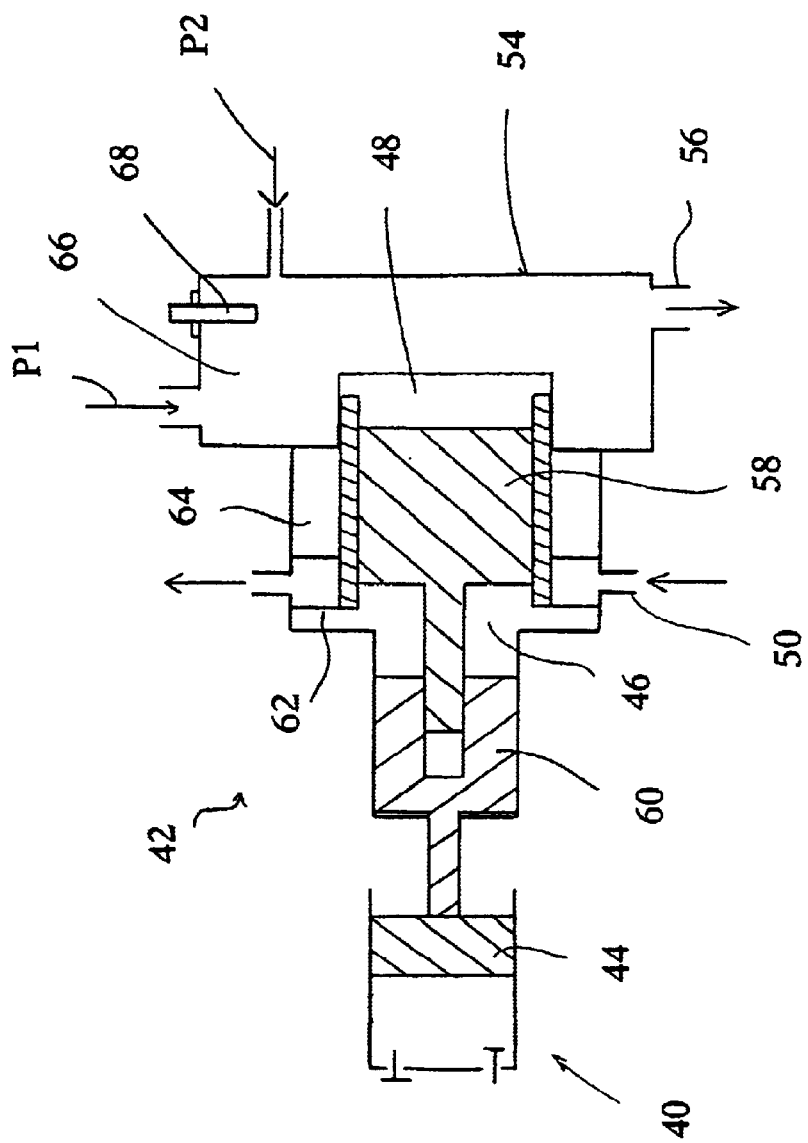
FIG. 2 is an enlarged view of the area of the system comprising a Stirling motor shown in FIG. 1.

The basic design of the Stirling motor 42 and of various system components interacting with same is described below with reference to FIG. 2. It is seen in FIG. 2 that the Stirling motor 42 in the example shown is designed as a displacement motor or a so-called free-piston Stirling motor. This comprises a displacer 58 and a piston 60. The piston 60 of the Stirling motor 42 is coupled with the compressor 40 or the piston 44 of same for the joint shifting movement. It should be pointed out here that a compressor of a different design could, of course, also be driven by the piston 60 of the Stirling motor 42. On both axial sides of the displacer 58 placed in the shifting direction, the cold space 46 and the hot space 48 are formed, whereby the cold space 46 also lies essentially between the piston 60 and the displacer 58. The Stirling motor 42 also has a cooler 62, which is integrated in the coolant circulation 50 and is thus passed through by the motor coolant also circulating through the driving motor. Further, a regenerator 64 is provided. The medium periodically shifted between the cold space 46 and the hot space 48, which is generally air, flows through the cooler 62 and the regenerator 64.

The heater 54 is assigned to the hot space 48 for heating. As is indicated by an arrow $P_1$, the air for combustion is led into a combustion chamber of same, generally designated by 66. The arrow $P_2$ symbolizes the introduction of fuel. Further, an igniting member, e.g., a glow type igniting plug 68, protrudes into the combustion chamber 66, so that the mixture consisting of air for combustion and atomized or evaporated fuel can be ignited. The combustion exhaust gases flow around the hot space 48 or a line area leading to same in order to achieve the desired heating. The combustion exhaust gases or other combustion products then leave the combustion chamber 66 and the heater 54 and then flow, if desired, as indicated by the line 56, to the heating heat exchanger 38, or are, if a heating operation is not necessary or desired, discharged to the outside via an exhaust gas guiding system.

By using the Stirling motor 42 for driving a compressor 40, it is also possible, independently of the operation of the driving motor 18 of the vehicle, to put the air-conditioning device into operation, so that a vehicle interior may be cooled even when parked. The low temperature in the cold area 46 necessary in the Stirling motor is provided by using the motor coolant, whereby the driving motor 18 is used to lower the temperature here. The waste heat produced in the heater 54 assigned to the hot area can be used to be able to lead warm air into the vehicle interior in the manner of a parking heater or an auxiliary heater, e.g., if the Stirling motor 42 is not operated.

Electrically, the system according to the present invention when operating is to be classified as a parking air-conditioning system, like a conventional parking heater, since the heater 54 described above is present as a fundamental energy source. In order to be able to provide a system that works independently after starting, i.e., also independently providing itself with electrical energy, it is also conceivable not only to drive a compressor with the Stirling motor 42, but also additionally to drive a generator, which, when operated, then provides the necessary electrical energy, especially for the operation of the fuel pump, the combustion air fan and the cooling air or hot air fan, via which the temperature-controlled air can then be fed into the vehicle interior.

While specific embodiments of the invention have been shown and described in detail to illustrate the application of the principles of the invention, it will be understood that the invention may be embodied otherwise without departing from such principles.

What is claimed is:

1. A temperature control system for a vehicle, the system including an air-conditioning device comprising:
    a compressor device for compressing a working medium of the air-conditioning device;
    a first drive unit for driving the compressor device, the first drive unit comprising a driving motor of a vehicle; and
    a second drive unit for driving the compressor device, the second drive unit comprising a Stirling motor.

2. A temperature control system in accordance with claim 1, wherein a fuel-operated heater is assigned to said Stirling motor for providing a heating medium for heating a hot area of said Stirling motor.

3. A temperature control system in accordance with claim 2, wherein the heating medium comprises the combustion products produced in said heater.

4. A temperature control system in accordance with claim 2, further comprising a heating heat-exchanger device, in which air to be heated can be heated by the heating medium.

5. A temperature control system in accordance with claim 1, wherein a cooling medium circulation is provided to said Stirling motor for feeding a cooling medium to a cold area of said Stirling motor.

6. A temperature control system in accordance with claim 5, wherein the cooling medium comprises the coolant of said driving motor of a vehicle.

7. A temperature control system in accordance with claim 1, wherein said compressor device comprises a first compressor which can be driven by said first drive unit and a second compressor which can be driven by said Stirling motor.

8. A temperature control system in accordance with claim 7, further comprising a valve array for selectively switching on said working medium circulation of said first compressor or said second compressor.

9. A temperature control system in accordance with claim 1, wherein said Stirling motor is a free-piston Stirling motor.

10. A temperature control system for a vehicle, the system comprising:
    an air-conditioning device;
    a compressor device for compressing a working medium of said air-conditioning device;
    a drive unit comprising a Stirling motor, the compressor device being driven by said Sterling motor;
    another drive unit driving the compressor device, the another drive unit comprising a driving motor of a vehicle.

11. A temperature control system in accordance with claim 10, wherein said compressor device comprises a first compressor which can be driven by said first drive unit and a second compressor which can be driven by said Stirling motor.

12. A vehicle temperature control system, the system corn rising:
    a motor vehicle with an internal combustion engine for driving the vehicle;
    an air-conditioning device;
    a compressor device for compressing a working medium of said air-conditioning device;
    a drive unit comprising a Stirling motor, the compressor device being driven by said Sterling motor and said internal combustion engine.

13. A vehicle temperature control system in accordance with claim 12, wherein a fuel-operated heater is assigned to said Stirling motor for providing a heating medium for heating a hot area of said Stirling motor, the heating medium comprising he combustion products produced in said heater.

14. A temperature control system in accordance with claim 13, further comprising a heating heat-exchanger device, in which air to be heated can be heated by the heating medium.

15. A temperature control system in accordance with claim 12, wherein a cooling medium circulation is provided to said Stirling motor for feeding a cooling medium to a cold area of said Stirling motor.

16. A temperature control system in accordance with claim 15, wherein the cooling medium comprises the coolant of said internal combustion engine of the vehicle.

17. A temperature control system in accordance with claim 12, wherein said compressor device comprises a first compressor driven by said internal combustion engine of the vehicle and a second compressor driven by said Stirling motor.

18. A temperature control system in accordance with claim 17, further comprising a valve array for selectively switching on said working medium circulation of said first compressor or said second compressor.

19. A temperature control system in accordance with claim 12, said Stirling motor is a free-piston Stirling motor.

* * * * *